Nov. 4, 1947.                F. CARTLIDGE                2,430,104
         PROPULSION MEANS FOR MATERIAL GATHERING AND LOADING MACHINES
                       Filed March 23, 1945          4 Sheets-Sheet 1

INVENTOR
Frank Cartlidge
Clarence F. Poole
ATTORNEY

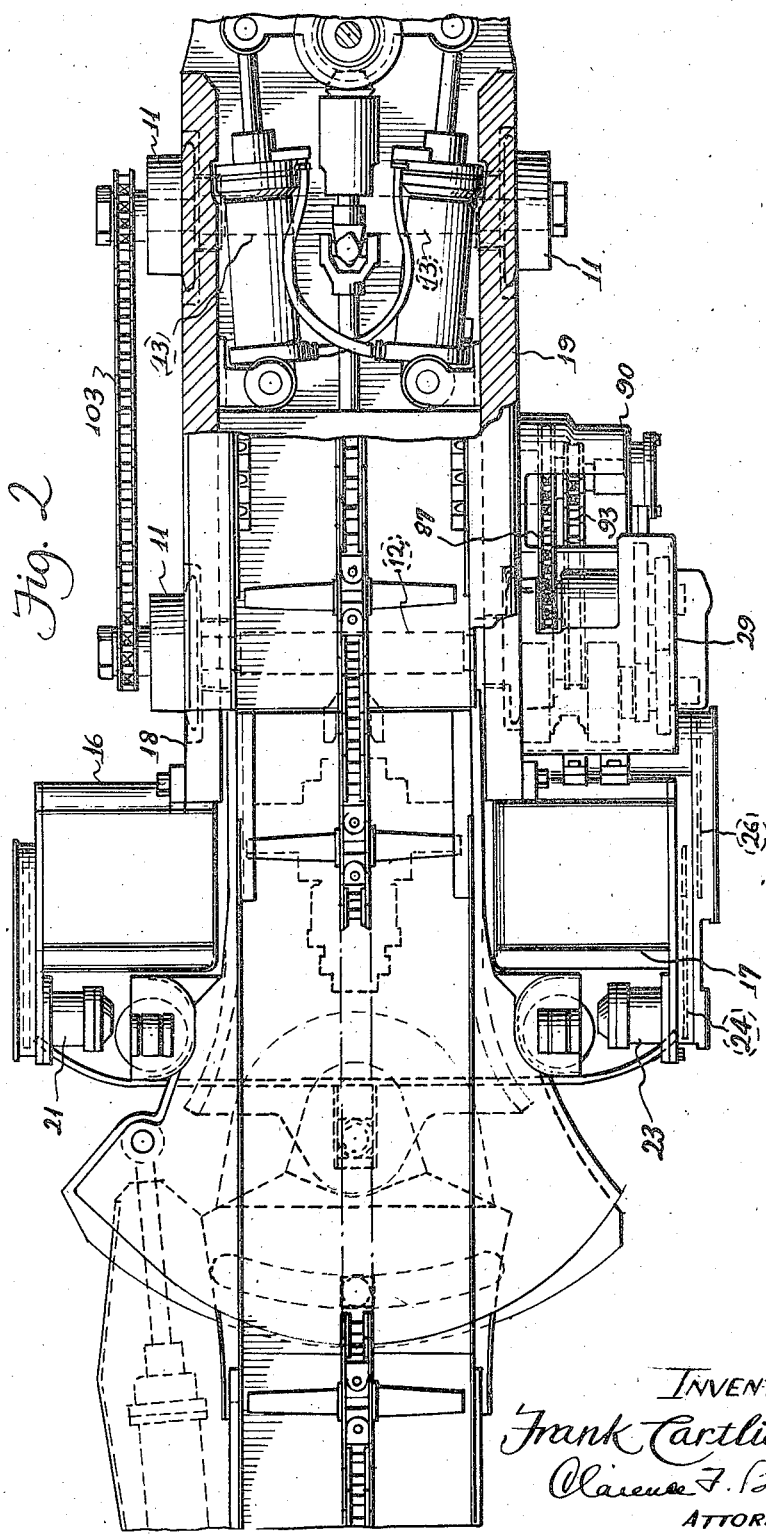

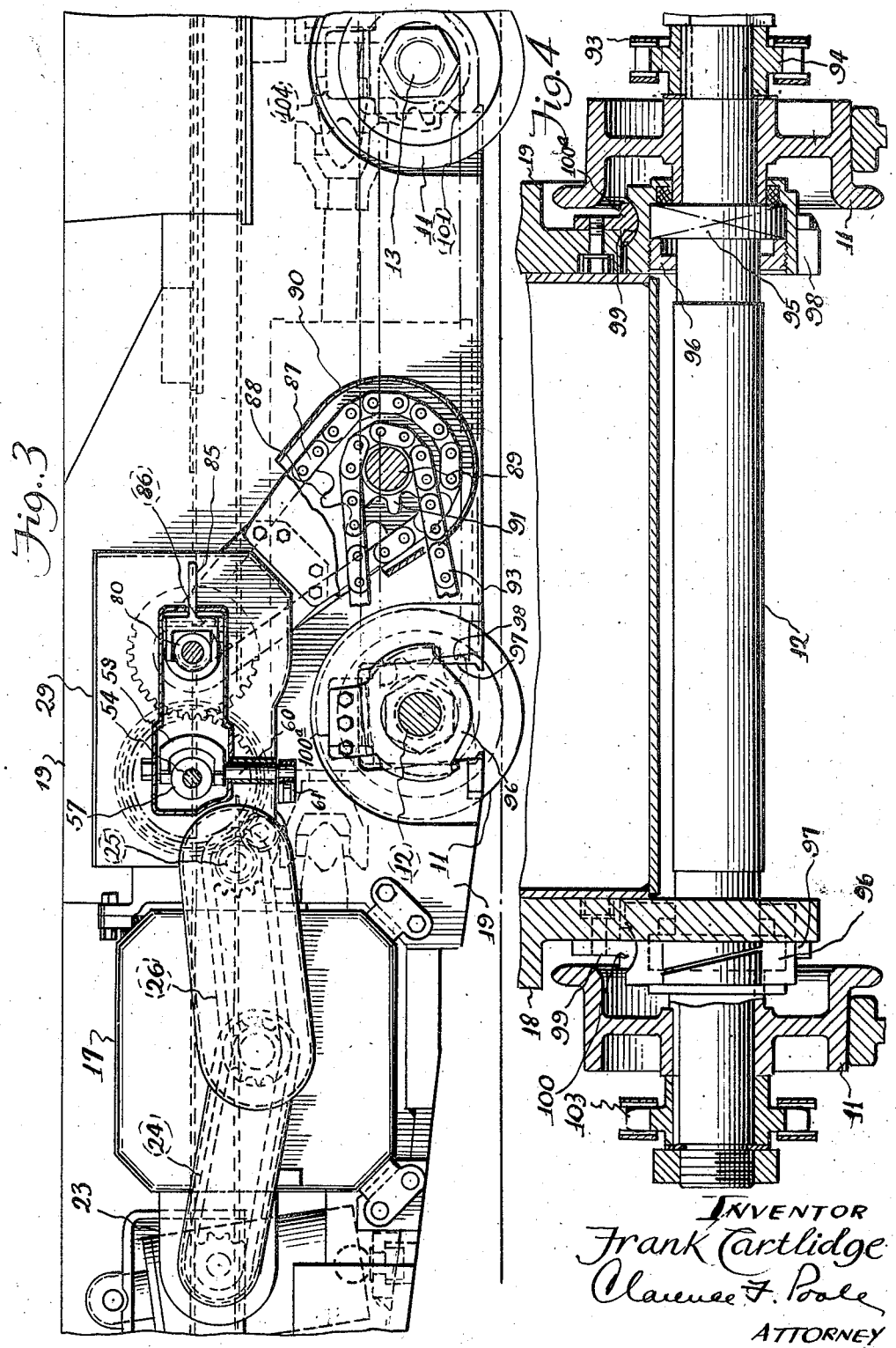

Nov. 4, 1947.    F. CARTLIDGE    2,430,104
PROPULSION MEANS FOR MATERIAL GATHERING AND LOADING MACHINES
Filed March 23, 1945    4 Sheets-Sheet 4
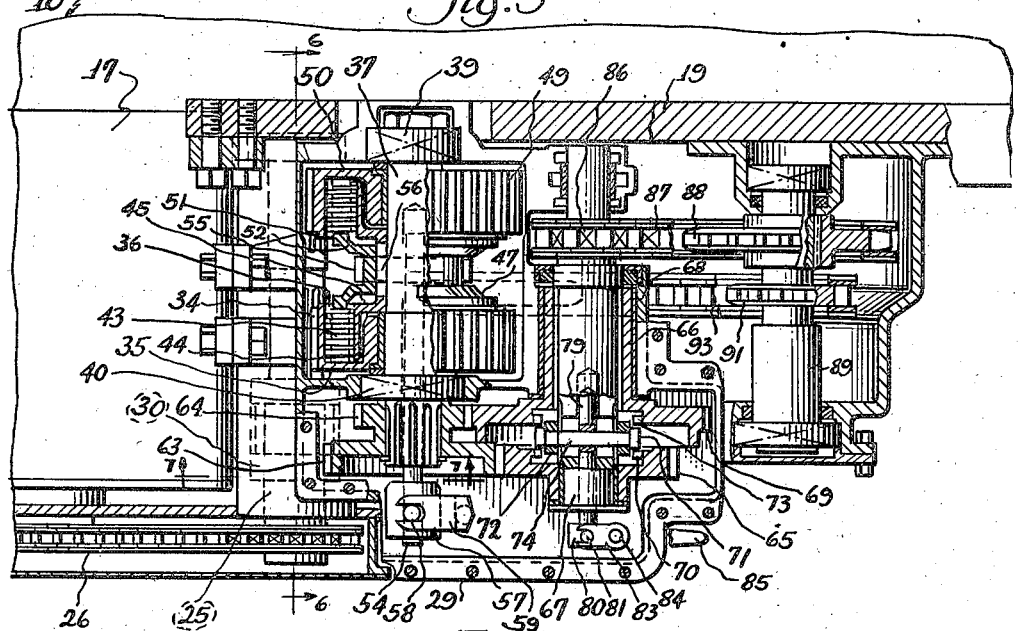

Patented Nov. 4, 1947

2,430,104

UNITED STATES PATENT OFFICE 2,430,104

PROPULSION MEANS FOR MATERIAL GATHERING AND LOADING MACHINES

Frank Cartlidge, Chicago, Ill., assignor to Goodman Manufacturing Company, Chicago, Ill., a corporation of Illinois Application March 23, 1945, Serial No. 584,347

4 Claims. (Cl. 105—101)

1

One difficulty frequently encountered in loading machines of the type where the track wheels are driven from a drive chain and sprockets and where the axle driving the chain and sprockets is vertically movable to permit the machine to travel along and operate from a rough and uneven track, is that due to the low vertical height of the machine it is not possible to position the driving shaft for the chain and sprocket drive and the axle driven thereby in such relation with respect to each other as to maintain the drive chain at substantially the same chain tension in all positions of the truck axle with respect to the machine frame, and it is difficult to find room to provide an automatic tightener for the chain. This is particularly true where, in order to get the proper speed reduction for the truck, a large drive member must be mounted on the drive shaft of the chain and sprocket drive, and in order to obtain the required clearance between this drive member and the ground or the track rails, it is necessary to place the drive shaft of the chain and sprocket drive at a higher level than the truck axle itself, thus resulting in a tightening or loosening of the drive chain each time the truck axle moves vertically, causing undue wear on the chain and an excessive amount of chain breakage.

The principal objects of my invention are to remedy these difficulties by providing a simplified and improved form of transmission for driving the axles and wheels of a track mounted loading machine by means of endless chains, wherein the guides for the axle boxes of the truck axles are so formed as to maintain substantially the same chain tension in all positions of the truck axles with respect to the truck frame.

These and other objects of my invention will appear from time to time as the following specification proceeds and with reference to the accompanying drawings wherein:

Figure 2 is a rear continuation of the machine shown in Figure 1, with certain parts broken away and certain other parts shown in horizontal section;

Figure 3 is a fragmentary view in side elevation of the central part of the loading machine, with certain parts broken away and certain other parts shown in section in order to illustrate certain details of the invention;

Figure 4 is a transverse sectional view taken through the rear drive axle for the loading machine;

Figure 5 is an enlarged detail plan view of the transmission for driving the rear axle, with certain parts broken away and certain other parts shown in horizontal section;

Figure 6 is a fragmentary transverse sectional view taken substantially along line 6—6 of Figure 5; and Figure 7 is an enlarged detail sectional view taken substantially along line 7—7 of Figure 5.

Figure 1:
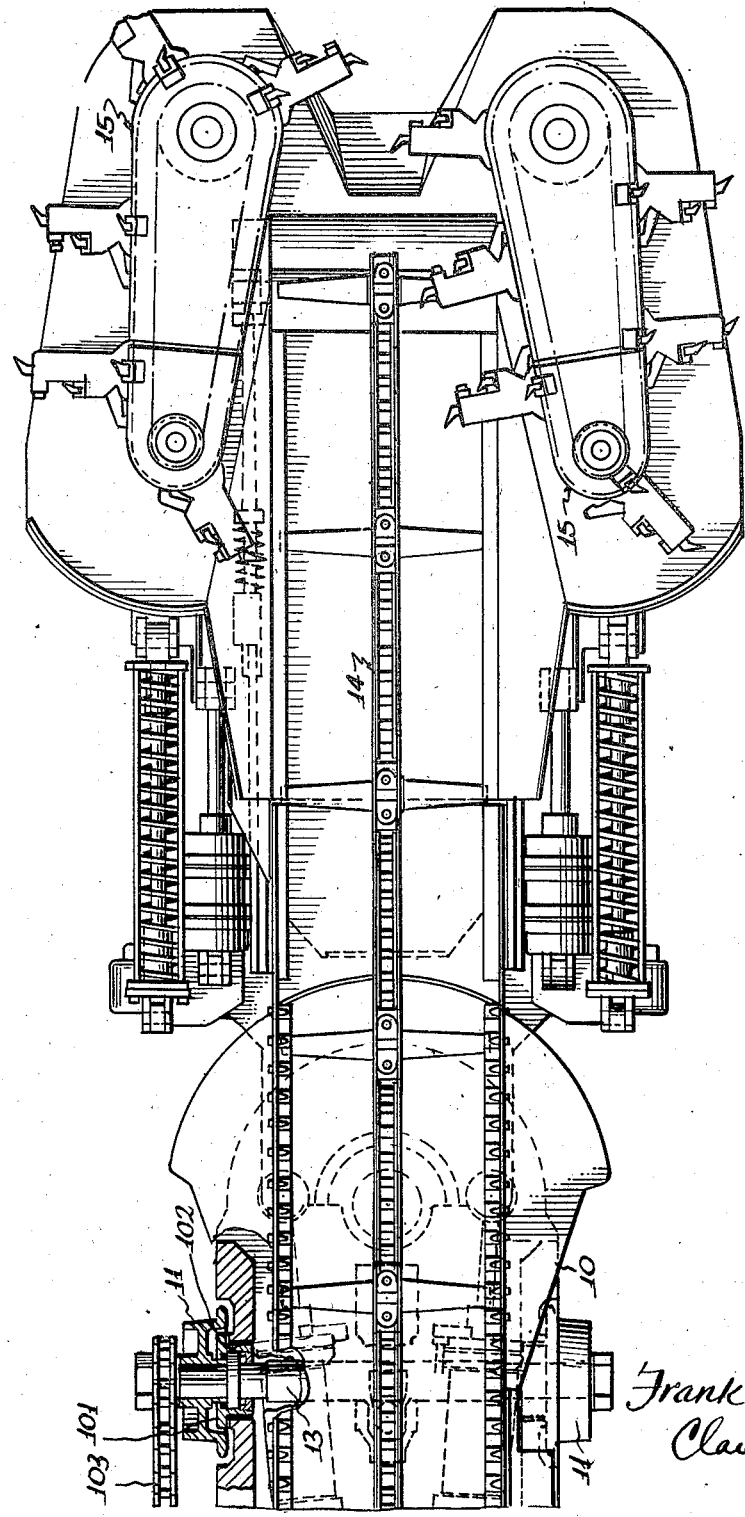
Figure 1 is a plan view of the forward part of a loading machine constructed in accordance with my invention.

The loading machine illustrated in Figures 1, 2 and 3 of the drawings consists generally in a truck or main frame 10 mounted on track wheels 11, 11 and axles 12 and 13, having a conveyer 14 extending in an inclined direction from the ground in advance of said main frame over the top thereof and beyond the rear end thereof in an overhanging position with respect to said main frame, so as to discharge material into mine cars or the like. Endless chain gathering devices 15, 15 extend along opposite sides of the forward inclined portion of said conveyer and in advance of the forward end thereof, for picking up loose material from the ground and loading it onto said conveyer. Said loading machine is of a type somewhat similar to that shown and described in application Serial No. 497,004, filed by me on August 2, 1943, except that it is mounted on track wheels instead of continuous traction tread devices, so is only herein shown and described in so far as is necessary to make my present invention clearly understandable.

Two motors 16 and 17 are mounted on opposite side plates 18 and 19 of the main frame 10, at the rear ends of said side plates, and project laterally from said side plates. The motor 16, besides serving to drive a fluid pump 21 from the outer end of its armature shaft, is connected with the motor 17 at the inner end of its armature shaft to drive the conveyer 14 and the gathering devices 15, 15 by means of a suitable transmission similar to that shown and described in my prior application Serial No. 497,004, and no part of my present invention, so not herein shown or described.

The motor 17 drives a fluid pump 23 from the outer end of its armature shaft through a chain and sprocket drive 24. Said motor also serves to drive the axles 12 and 13 and track wheels 11, 11 from the outer end of its armature shaft through a transverse shaft 25 driven from said motor by means of a chain and sprocket drive 26. Said transverse shaft is disposed forwardly of said motor and is journaled in the rear part of a gear casing 29 which is mounted on the outer side of the side plate 19, for removal from said side plate, thus making it unnecessary to lift said casing with its gearing when repairing the machine, and rendering said gearing accessible for repair at the working face of the mine, where the headroom may be so low that it would not be possible to lift any of the parts of the machine vertically to obtain access thereto for repair.

The transverse shaft 25 extends inwardly from the chain and sprocket drive 26 towards the side plate 19 of the main frame 10, and is journaled in the gear casing 29 on spaced ball bearings 30, 30 (see Figures 5 and 6). Said shaft has two spur pinions 31 and 32 cut integrally therewith, the spur pinion 32 being of a larger diameter than the pinion 31 (see Figure 6). The spur pinion 31 meshes with an idler gear 33 journaled in said gear casing. Said idler gear meshes with a spur gear 34 herein shown as being formed integrally with a housing 35 for a clutch 36. Said clutch housing is journaled on a transversely extending shaft 37 supported adjacent its inner end in the inner end wall of the gear casing 29 on a ball bearing 39. Said shaft is journaled adjacent its opposite end in said gear casing, just outside of said clutch housing on a ball bearing 40.

The clutch 36 is herein shown as being a friction disk clutch of a well known form including a plurality of interengaging friction disks 43, 43, alternate disks of which are splined to the inner periphery of the housing 35. The other disks of said clutch are splined on an inwardly projecting portion 44 of a drive member 45, which is keyed on the shaft 37 intermediate its ends. An engaging member 47 is slidably mounted on said drive member to engage the disks 43, 43 with each other, and cause said housing 35 to drive said drive member and the shaft 37 in a manner well known to those skilled in the art.

The spur pinion 32 meshes with and drives a spur gear 49, herein shown as being formed integrally with the outer periphery of a housing 50 of a clutch 51. Said clutch is journaled on the shaft 37 and is provided with an engaging member 52, herein shown as being formed integrally with the engaging member 47 and adapted to engage the disks of said clutch 51 with each other in the same manner the disks 43, 43 of the clutch 36 are engaged with each other, to drive the driving member 45 and shaft 37 in a reverse direction from which it is driven by the clutch 36.

The clutches 36 and 51 are shifted to engage one clutch and disengage the other by means of a shifting rod 54 extending through the center of the shaft 37 and slidably mounted therein. A key 55 extends through the central portion of the engaging member 47 and through elongated slots 56, 56 formed in opposite sides of the drive member 45. Said key also extends through a slotted portion of the shaft 37 (not shown) and through the rod 54, to rectilinearly move the engaging members 47 and 52 upon rectilinear movement of said shifting rod, to engage one clutch and release the other, or to move both of said clutches to a disengaged or neutral position.

The means for shifting the rod 54 along the shaft 37, to shift said clutches, is herein shown as comprising a collar 57 secured to the outer end of said rod and having pins 58, 58 extending upwardly and downwardly from its opposite sides. Said pins are slidably engaged by a fork 59 on the upper end of a rock shaft 60, journaled in the casing 29. The lower end of said rock shaft extends below the bottom of said casing and has a hand operating lever 61 secured thereto.

The outer end of the shaft 37 is splined and has two integrally formed spur gears 63 and 64 mounted thereon for driving said gears. The spur gear 63 is of a larger diameter than the spur gear 64 and meshes with and drives a spur gear 65 journaled on its hub on the outer end of a transverse shaft 67 (see Figure 5).

The spur gear 64 meshes with a spur gear 69 freely mounted on the transverse shaft 67. Said spur gear is herein shown as being formed integrally with a sleeve 66 encircling said transverse shaft and extending inwardly from said spur gear and journaled in the gear casing 29 on a bearing 68.

Clutch teeth 70, 70 are formed integrally with the inside of the spur gear 65 and are adapted to be engaged with clutch teeth 71, 71 on a clutch member 72 splined on the shaft 67, for driving said shaft at the speed of rotation of the shaft 37. In a like manner, clutch teeth 73, 73 are formed integrally with the spur gear 69 and are adapted to be engaged by the clutch teeth 71, 71 for driving the shaft 67 at a slower speed than from the spur gear 65.

The clutch member 72 is shifted by means of a flat key 74 extending through a slotted portion of the shaft 67 and through opposite sides of said clutch member. Said key likewise extends through a shifting rod 79 mounted in the center of said shaft for sidable movement therealong. Said shifting rod has a shifting collar 80 on its outer end having pins 81, 81 extending from opposite sides thereof, which are engaged by a clutch fork 83 on a vertical shaft 84. A hand lever 85 formed integral with said clutch fork is provided to rock said shaft and shift said clutch, to drive the shaft 67 at either a high or a low speed.

A sprocket 86 is keyed on said shaft inwardly of the sleeve 66. A chain 87 meshing with said sprocket forms a drive member for a sprocket 88 on a transverse shaft 89, disposed beneath the shaft 67 and gear casing 29 and journaled at its opposite ends in a bearing support and chain guard member 90. Said bearing support and chain guard member is secured to and extends outwardly from the side plate 19, to permit removal of said shaft from the side of said side plate, in a simple operation. A sprocket 91 on said shaft has a chain 93 meshing therewith, which meshes with and drives a sprocket 94 on the outer end of the rear truck axle 12.

The rear truck axle 12 is journaled inwardly of the wheels 11, 11 on ball bearings 95, 95 mounted in axle boxes 96, 96 (see Figure 4). Said axle boxes are slidably mounted in vertically extending guideways 97, 98. Said axle boxes are of the same construction, but guideway 97, which is on the side of the machine opposite from the sprocket 94, extends vertically, while the guideway 98, which is on the side of the machine adjacent said sprocket, is herein shown as being inclined from the lower end of said frame with respect to the vertical in a direction away from the transverse drive shaft 89. The angle of inclination of the sides of said guideway 98 is normal to a line intersecting the center of said drive shaft and the center of said axle. Said guideway is thus arranged in planes conforming substantially to arcs struck from the center of the shaft 89 at an angle which will not materially increase or decrease the distance between the center of said drive shaft 89 and the center of the axle 12 as the axle box 96 moves vertically along its guideway, so as to maintain a substantially uniform tension on the drive chain 93 in all positions of said axle with respect to its truck frame.

The upper sides of the axle boxes 96, 96 have recessed concave engaging surfaces 99, 99 formed therein and extending longitudinally therealong. The left-hand axle box 96 is adapted to be engaged by a convex bearing member 100 secured to the side plate 18 within the guideway 97 and depending from the top of said guideway. The right-hand axle box 96 is adapted to be engaged by a convex bearing member 100a secured to the side plate 19 within the guideway 98 and depending from the top of said guideway. Said bearing members extend longitudinally of the truck and perpendicularly to the sides of their associated guideways so the rear drive axle 12 may rock about either of the bearing members 100 or 100a and may move vertically within the guideways 97 and 98.

The front axle 13 is mounted on spaced axle boxes 101, 101 slidably mounted in vertically extending guideways 102, 102 (see Figure 1). Said axle and its track wheels are driven from the rear axle by means of a chain and sprocket drive indicated generally by reference character 103. Said axle boxes are engaged by convex bearing members 104, 104 much like the bearing members 100, 100a.

The front axle is thus guided for vertical movement about either of its ends in a path extending perpendicularly of the rails. The end of the rear axle 12 connected with the front axle 13 of the chain and sprocket drive 103 is also guided for vertical movement in a path extending perpendicularly of the mine rails, while the opposite end of said axle is guided for vertical movement in a path inclined with respect to the vertical at an angle which is perpendicular to a line extending through the center of the shaft 89 and the axle 12, thus insuring a substantially uniform tension on chains 93 and 103 in all positions of the axles 12 and 13 with respect to their guideways, without resorting to automatic take-ups for said chains.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an apparatus of the class described, a truck including a frame supported on track wheels and axles, a motor on said truck, a drive connection from said motor to said axles including a drive shaft disposed on a higher level than said axles and driven by said motor, a sprocket on said shaft, a sprocket on one of said axles, adjacent one end thereof, a chain connecting said sprockets together for driving said axle from said drive shaft, a chain and sprocket drive adjacent the opposite ends of said axles from said drive chain, for connecting said axles together and driving one axle from the other, bearing supports for said axles including spaced axle boxes for each of said axles and guideways in said truck frame for said axle boxes, the guideway for the end of said axle adjacent said drive chain and said sprocket driven from said drive shaft being inclined in a direction away from said drive shaft, at an angle which is normal to a line passing through the center of said drive shaft and the center of said axle, and the guideways for said other axle boxes extending in a substantially vertical direction to maintain substantially the same tension on said drive chain and the chain of said chain and sprocket drive, in all positions of said axles with respect to said truck.

2. In an apparatus of the class described, a truck including a frame supported on track wheels and axles, a motor on said truck, a drive connection from said motor to said axles including a drive shaft disposed on a higher level than said axles and driven by said motor, a sprocket on said shaft, a sprocket on one of said axles, adjacent one end thereof, a chain connecting said sprockets together for driving said axle from said drive shaft, a chain and sprocket drive adjacent the opposite ends of said axles from said drive chain for connecting said axles together and driving one axle from the other, bearing supports for said axles including spaced axle boxes for each of said axles and guideways in said truck frame for said axle boxes, bearing means mounted at the upper ends of said guideways and engaging the upper sides of said axle boxes, to guide said axle boxes for movement about axes extending longitudinally of said truck, said bearing means extending perpendicularly to the sides of said guideways, and the sides of said guideway for the end of said axle adjacent said drive chain and said sprocket driven from said drive shaft being inclined in a direction away from said drive shaft, at an angle which is normal to a line passing through the center of said drive shaft and the center of said axle, and said other guideways extending in a substantially vertical direction so said guideways may maintain said drive chain and the chain of said chain and sprocket drive at substantially the same tension in all positions of said axle boxes with respect to said truck frame.

3. In an apparatus of the class described, a truck including a frame and track wheels and axles for supporting said frame, bearing supports for said axles, permitting vertical movement of said axles with respect to said truck including a pair of laterally spaced axle boxes for each of said axles and upright guideways for said axle boxes, a drive chain and sprockets connecting said axles together at one of their ends to drive one axle from the other, means for driving said axles including a sprocket on one of said axles on its end opposite from said drive chain and sprockets, a drive shaft, a sprocket thereon, a chain connecting said sprockets together, a motor, a drive member on said drive shaft driven by said motor, said drive member being of a larger diameter than said sprockets and spacing said drive shaft on a higher level than said axle, to provide clearance between said drive member and the ground, said guideways for said axle boxes for one axle and for one axle box of said other axle extending vertically and said guideway for said axle box adjacent said sprocket driven by said drive shaft extending at an angle with respect to said other guideways, which is normal to a line passing through the center of said drive shaft and the center of said axle, to maintain substantially the same tension on said drive chains in all positions of vertical displacement of said axles with respect to said frame.

4. In an apparatus of the class described, a truck including a frame and track wheels and axles for supporting said frame, bearing supports for said axles, permitting vertical movement of said axles with respect to said truck including a pair of laterally spaced axle boxes for each of said axles and upright guideways for said axle boxes, a drive chain and sprockets connecting said axles together at one of their ends to drive one axle from the other, means for driving said axles including a sprocket on one of said axles on its end opposite from said drive chain and sprockets, a drive shaft, a sprocket thereon, a chain connecting said sprockets together, a motor, a drive member on said drive shaft driven by said motor, said drive member being of a larger diameter than said sprockets and spacing said drive shaft on a higher level than said axle, to provide clearance between said drive member and the ground, said guideways for said axle boxes for one axle and for one axle box of said other axle extending vertically and said guideway for said axle box adjacent said sprocket driven by said drive shaft extending at an angle with respect to said other guideways, which is perpendicular to a line passing through the center of said drive shaft and the center of said axle, to maintain substantially the same tension on said drive chains in all positions of vertical displacement of said axles with respect to said frame, and bearing means mounted at the upper ends of said guideways and engaging the upper sides of said axle boxes, to guide said axle boxes for movement about axes extending longitudinally of said truck, said bearing means for three of said axle boxes extending longitudinally of said truck in a plurality of horizontal planes, and said bearing means for said axle box adjacent said drive chain being inclined at an angle parallel to said line extending through the center of said drive shaft and the center of said axle.

FRANK CARTLIDGE.

REFERENCES CITED

The following references are of record in the file of this patent:

UNITED STATES PATENTS

| Number | Name | Date |
|---|---|---|
| 908,922 | Whitcomb | Jan. 5, 1909 |
| 801,602 | Moss | Oct. 10, 1905 |
| 1,662,793 | Holdsworth | Mar. 13, 1928 |
| 353,395 | Adams | Nov. 30, 1886 |
| 1,613,106 | Holmes | Jan. 4, 1927 |
| 1,664,385 | Holmes | Mar. 27, 1928 |
| 2,263,701 | Jeffrey | Nov. 25, 1941 |
| 1,841,541 | Levin | Jan. 19, 1932 |